United States Patent
Johnston et al.

(10) Patent No.: US 11,372,790 B2
(45) Date of Patent: *Jun. 28, 2022

(54) REDUNDANCY IN A PCI EXPRESS SYSTEM

(71) Applicant: NXP USA, INC., Austin, TX (US)

(72) Inventors: Michael Johnston, Paisley (GB);
Dinghui R. Nie, Austin, TX (US);
Joseph S. Rebello, Edinburgh (GB)

(73) Assignee: NXP USA, INC., Austin, TX (US)

( * ) Notice: Subject to any disclaimer, the term of this patent is extended or adjusted under 35 U.S.C. 154(b) by 67 days.

This patent is subject to a terminal disclaimer.

(21) Appl. No.: 16/717,196

(22) Filed: Dec. 17, 2019

(65) Prior Publication Data

US 2020/0125521 A1 Apr. 23, 2020

Related U.S. Application Data

(63) Continuation of application No. 14/728,462, filed on Jun. 2, 2015, now Pat. No. 10,572,426.

(51) Int. Cl.
*G06F 13/20* (2006.01)
*G06F 13/40* (2006.01)
*G06F 13/42* (2006.01)

(52) U.S. Cl.
CPC ...... *G06F 13/4027* (2013.01); *G06F 13/4282* (2013.01)

(58) Field of Classification Search
CPC ........... G06F 2213/0026; G06F 13/409; G06F 13/385; G06F 13/387; G06F 2213/0024; G06F 13/382
USPC .................................. 710/305–306, 316–317
See application file for complete search history.

(56) References Cited

U.S. PATENT DOCUMENTS

| | | | | |
|---|---|---|---|---|
| 6,671,181 B2 * | 12/2003 | Kaminski | ............ | H05K 7/1405 |
| | | | | 361/755 |
| 8,677,180 B2 | 3/2014 | Bayer et al. | | |
| 9,842,075 B1 * | 12/2017 | Davis | .................. | G06F 13/4295 |
| 2007/0147359 A1 * | 6/2007 | Congdon | ................ | H04L 49/65 |
| | | | | 370/386 |

(Continued)

OTHER PUBLICATIONS

Budruk, "An Introduction to PCI Express," Mindshare, 18 pages, 1996.

(Continued)

*Primary Examiner* — Henry Tsai
*Assistant Examiner* — Kim T Huynh (57) ABSTRACT

A data processing system is implemented with a backup PCI Express system, which is able to take over as the primary PCI Express system for ensuring that an endpoint device continues to function in a desired manner when a root complex in the primary PCI Express system is no longer functioning correctly or is deactivated for maintenance. The endpoint device is coupled to the primary root complex and a backup root complex through a multiplexer. When a failure or shutdown of the primary root complex is detected, the multiplexer is signaled to switch the communication of data from occurring between the primary root complex and the endpoint device to then occur between the backup root complex and the endpoint device. A PCI Express Link may be utilized to communicate such a failure or shutdown and/or to transfer information from the primary PCI Express system to the backup PCI Express system when the switch occurs.

20 Claims, 5 Drawing Sheets

(56) References Cited

U.S. PATENT DOCUMENTS

| | | |
|---|---|---|
| 2008/0288664 A1 | 11/2008 | Pettey et al. |
| 2009/0292854 A1 | 11/2009 | Khoo |
| 2011/0185163 A1 | 7/2011 | Hidaka |
| 2011/0246686 A1 | 10/2011 | Cavanagh, Jr. |
| 2012/0144230 A1 | 6/2012 | Buckland et al. |
| 2013/0042045 A1 | 2/2013 | Davis et al. |
| 2014/0075006 A1 | 3/2014 | Cherian et al. |
| 2014/0089541 A1 | 3/2014 | Tresidder |
| 2015/0339246 A1 | 11/2015 | Sakurai |
| 2015/0356036 A1 | 12/2015 | Feehrer |
| 2016/0147697 A1 | 5/2016 | Arroyo |
| 2016/0187952 A1* | 6/2016 | Gough ................. G06F 1/28 713/340 |
| 2016/0239454 A1 | 8/2016 | Borland |
| 2016/0321094 A1 | 11/2016 | Rabi |
| 2016/0357695 A1 | 12/2016 | Johnston |
| 2017/0010993 A1* | 1/2017 | Pearson ............. G06F 13/362 |

OTHER PUBLICATIONS

Budruk, "PCI Express Basics," PCI-SIG Developers Conference, 2007.
P12PCIE2412 Mux/DeMux Data Sheet, Pericom Semiconductor Corporation, Mar. 26, 2014.
Regula, "Using Non-transparent Bridging in PCI Express Systems," PLX Technology, Inc., Jun. 1, 2004.
Wikipedia, Conventional PCI, Retrieved from https://en.wikipedia.org/wiki/Conventional_PCI, Jun. 2, 2015.
Wikipedia, SERDES, Retrieved from http://en.wikipedia.org/w/index.php?title=SerDes&oldid=643652547, last modified Jan. 22, 2015.

* cited by examiner

REDUNDANCY IN A PCI EXPRESS SYSTEM

This application is a continuation of U.S. patent application Ser. No. 14/728,462 filed Jun. 2, 2015.

TECHNICAL FIELD

The present invention relates in general to processing within a computing environment, and more particularly, to providing redundancy within a system implementing PCI Express equipment.

BACKGROUND INFORMATION

The Peripheral Component Interconnect-Express (herein referred to as "PCI Express" or "PCIe") architecture utilizes a high-performance I/O ("input/output") bus to interconnect peripheral devices in applications, such as computing and communications platforms. A system employing a PCI Express architecture supports chip-to-chip interconnect and board-to-board interconnect via cards and connectors. More specifically, a PCI Express architecture implements one or more serial, point-to-point type interconnects for communications between two devices. Additionally, multiple PCI Express devices can be connected using switches that fan out the buses, making it possible to connect a large number of devices together in a system.

PCI Express systems are based on having a root complex ("RC") device (also referred to herein as simply a "root complex" or a "PCI Express root complex") and one or more endpoints. However, if a problem occurs in the root complex device so that it does not function correctly, then this affects the entire PCI Express system, causing major issues (e.g., the peripheral devices are not able to perform their required operations). Using a redundant root complex in such a system has only been possible if an external PCI Express bridge device is used to allow the system to function correctly. However, such an implementation adds cost, requires additional circuit board space, and introduces significant complexity to the system.

Many networking and industrial users of PCI Express systems need fault tolerant systems that allow for redundancy. Therefore, it would be beneficial to implement a system-level redundancy in a PCI Express system so that a backup PCI Express root complex is able to come online and take over in the event the primary root complex fails.

DETAILED DESCRIPTION

Aspects of the present disclosure provide for a backup PCI Express system, which is able to take over as the primary PCI Express system for ensuring that the endpoint devices continue to function in a desired manner when the initial primary root complex is no longer functioning correctly.

Embodiments of the present invention pertain to one or more data processing systems implementing a PCI Express architecture in accordance with the PCI Express Specifications as promulgated by the Peripheral Component Interconnect Special Interest Group (PCI-SIG). As previously noted, a data processing system implementing a PCI Express architecture (also referred to herein as a "PCI Express system") utilizes a high-performance I/O bus used to interconnect peripheral devices in applications such as computing and communication platforms. A PCI Express system essentially includes a PCI Express root complex device coupling one or more processors (e.g., one or more central processing units ("CPUs")) and an associated memory subsystem to one or more peripheral devices. These peripheral devices are often referred to as endpoint devices, or simply "endpoints." The root complex is generally associated with the processor(s) and is also responsible for configuring the PCI Express system at power up. The endpoints are the input/output ("I/O") devices in the system, i.e., the sources of, and destinations for, data. The root complex generates transaction requests on behalf of the processor(s), which may be interconnected to the root complex through a local bus. The root complex functionality may be implemented as a discreet device, or may be integrated with the processor(s). To further expand the overall capabilities of a PCI Express system, switching devices (also referred to herein as "switches") may be implemented in such systems to thereby connect more endpoint devices to the root complex. A switching device may be incorporated into a root complex device, resulting in a multi-port root complex. A root complex may contain more than one PCI Express port, and multiple switching devices may be connected to ports on the root complex or cascaded.

A PCI Express interconnect is referred to as a Link, and connects two devices within the PCI Express system. A Link may be comprised of either 1, 2, 4, 8, 12, 16, or 32 signals (also referred to herein as the "Link bandwidth") in each direction (since the system uses full-differential signaling, each signal utilizes two wires). These signals are referred to as Lanes. A Lane comprises signal pairs in each direction. For example, a "x1 Link" is one Lane, or one differential signal pair, in each direction for a total of four signals; a "x32 Link" is 32 Lanes, or 32 signal pairs, in each direction for a total of 128 signals. During hardware initialization (also referred to as "enumeration") of the PCI Express system, each Link is automatically initialized for Link bandwidth and frequency of operation by the devices on the opposite ends of the Link.

The PCI Express architecture encodes transactions using a packet-based protocol. Packets are transmitted and received serially across all of the available Lanes of a Link at the same time. Several types of packets may be implemented, such as memory read and write requests, I/O read and write requests, configuration read and write requests, message requests, and completions for split transactions.

A "hierarchy" as this term is utilized herein is the network of all the devices and Links associated with a root complex device, which are either directly connected to the root complex via its port(s) or indirectly connected via switching devices. A root complex connects the one or more processors and memory subsystem to the PCI Express hierarchy. A "hierarchy domain" is a network of device(s) and Link(s) that are associated with one port of a root complex. A root complex may support several PCI Express ports, with each port connected to an endpoint device, or to a switching device that then forms a sub-hierarchy where the switching device is further connected to one or more endpoint devices. The root complex generates transaction requests on behalf of the one or more processors. In response to processor commands, the root complex generates configuration, memory, and I/O requests, as well as locked transaction requests on the PCI Express system. The root complex transmits packets out of its ports and also receives packets into its ports, which it then forwards to the memory subsystem or the processor(s).

Endpoints are devices other than the root complex and switching devices that are requesters or completers of PCI Express transactions. Endpoints may be peripheral devices, such as Ethernet, USB, graphics devices, or any other type of peripheral device compatible with the PCI Express architecture. Endpoints initiate transactions as a requester or respond to transactions as a completer. As such, a requester is a device that originates a transaction in the PCI Express system. The root complex and endpoint devices are examples of requester devices. A completer is a device addressed or targeted by a requester. A requester reads data from a completer or writes data to a completer. The root complex and endpoint devices are examples of completer devices. A port is an interface between a PCI Express component and the Link, and includes differential transmitters and receivers. A switching device forwards packets using memory, I/O, or configuration address/based routing.

In accordance with some embodiments of the present invention, a PCI Express root complex device may be implemented as a root complex subsystem containing multiple PCI Express controllers, where each controller can be configured in either a root complex mode or an endpoint mode. Each of such PCI Express controllers may contain only one port. Such a root complex subsystem may therefore contain more than one PCI Express port.

Figure 1:
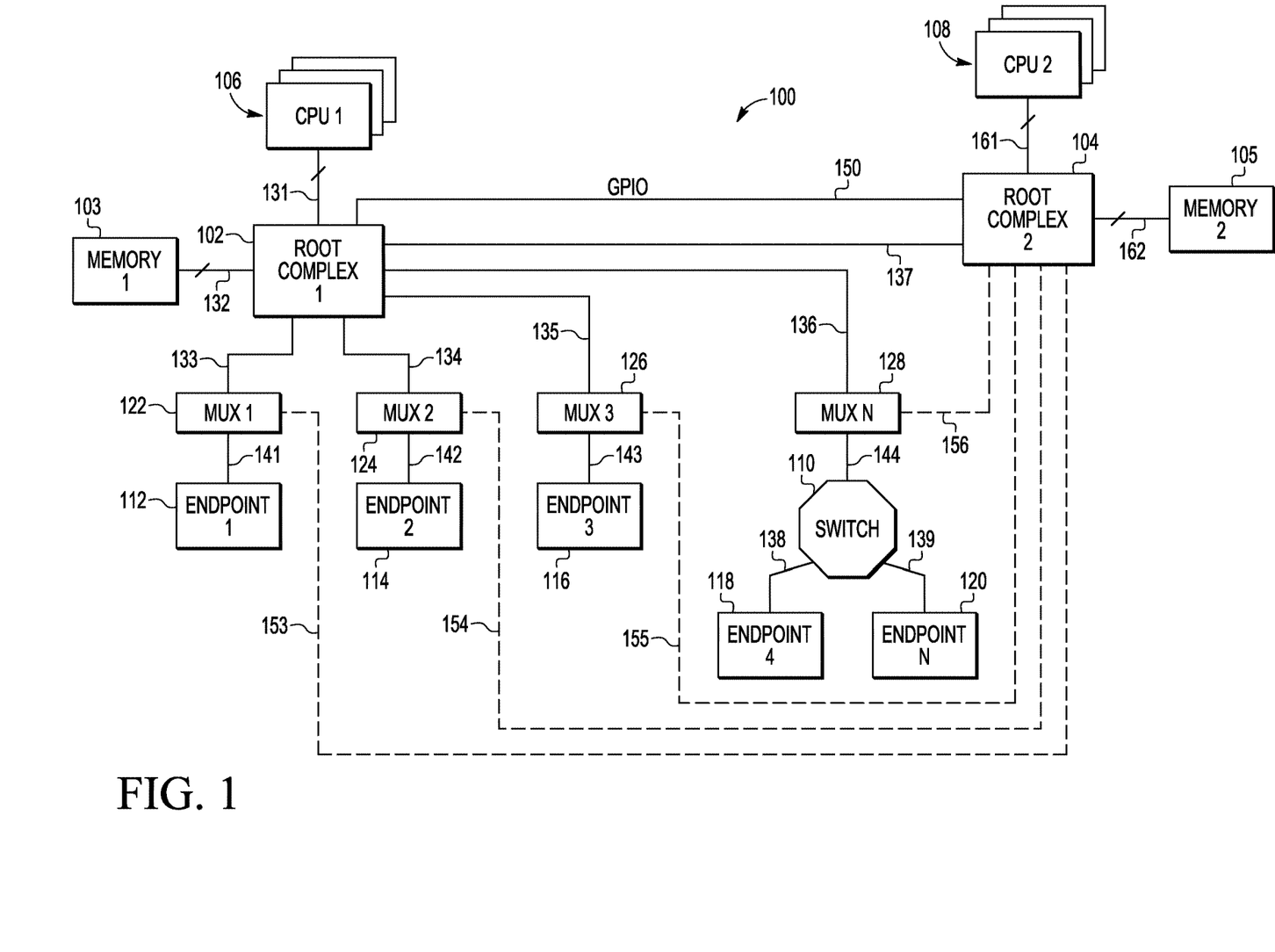
FIG. 1 illustrates a data processing system configured in accordance with embodiments of the present invention.

Referring now to FIG. 1, there is illustrated a data processing system 100 configured in accordance with embodiments of the present invention. One or more processors (labeled as "CPU 1" in FIG. 1) 106 are coupled to a first PCI Express root complex (labeled as "Root Complex 1") 102 by a local bus 131, or any other equivalent bus architecture. Likewise, a first memory subsystem (labeled as "Memory 1") 103 is coupled to the first PCI Express root complex 102 by a local bus 132, which may be part of the local bus 131.

The data processing system 100 may implement one or more endpoint devices for coupling through the first PCI Express root complex 102 to the processor 106 and memory subsystem 103. One or more of the endpoint devices are PCI Express endpoint devices. One or more of the endpoint devices may include legacy PCI devices coupled to the root complex 102 by a PCIe-to-PCI bridge device (not shown). FIG. 1 illustrates merely one example of such a network configuration for illustrating and describing embodiments of the present invention. This example was chosen and described in order to best explain principles of the invention and the practical application, and to enable others of ordinary skill in the art to understand the invention for various embodiments with various modifications as may be suited to the particular use contemplated. This exemplary network configuration shows a hierarchy including N endpoint devices 112 . . . 120 (where N is greater than or equal to 1). A first endpoint device (labeled as "Endpoint 1") 112 is coupled to a first port on the first PCI Express root complex 102 via a Link 133, the first multiplexor (labeled as "MUX 1") 122, and a Link 141. The multiplexor 122 is implemented to provide a system-level redundancy for the data processing system 100 as further described herein. It should be noted that a typical PCI Express network architecture would not include the multiplexer 122 and the Link 141 within a hierarchy domain, but would merely couple the first PCI Express root complex 102 to the endpoint device 112 via the Link 133. In the exemplary data processing system 100 illustrated in FIG. 1, a second endpoint device (labeled as "Endpoint 2") 114 is coupled to the first PCI Express root complex 102 by the Link 134, the second multiplexer (labeled as "MUX 2") 124, and the Link 142. Similarly, a third endpoint device (labeled as "Endpoint 3") 116 is coupled to the first PCI Express root complex 102 via the Link 135, the third multiplexer (labeled as "MUX 3") 126, and the Link 143. As with respect to the first endpoint device 112, if the described system was implemented without the system-level redundancy aspects according to embodiments of the present invention, the second endpoint device 114 would merely be coupled to the first PCI Express root complex 102 in this hierarchy domain via the Link 134 without the intervening second multiplexer 124 and the Link 142, and the third endpoint device 116 would merely be coupled to the first PCI Express root complex 102 in this hierarchy domain via the Link 135 without the intervening third multiplexer 126 and the Link 143.

To illustrate how embodiments of the present invention may couple multiple endpoints in a hierarchy to a root complex via a switching device, the exemplary data processing system 100 of FIG. 1 further couples a fourth endpoint device (labeled as "Endpoint 4") 118 to the first PCI Express root complex 102 via a Link 136, a fourth multiplexer (labeled as "MUX N") 128, a Link 144, a PCI Express switching device "labeled as "Switch") 110, and a Link 138. Likewise, an Nth endpoint device (labeled as "Endpoint N") 120 is shown coupled to the first PCI Express root complex 102 via the Link 136, the fourth multiplexer 128, the Link 144, the switching device 110, and a Link 139. The fourth multiplexer 128 is labeled as MUX N to indicate that there could be N (where N is greater than or equal to 1) multiplexers coupling a plurality of N endpoint devices or switching devices to the first PCI Express root complex 102.

The data processing system 100 further includes a second PCI Express root complex (labeled as "Root Complex 2") 104, which may be coupled to a second set of one or more processors (labeled as "CPU 2") 108 via a local bus 161, or any other equivalent bus architecture. Note that embodiments of the present invention may couple the first and second root complexes to the same processor(s). Furthermore, the second root complex 104 is coupled to a second memory subsystem (labeled as "Memory 2") 105 via a local bus 162, which may be a part of the local bus 161. The dashed lines 153-156 represent Links between the second root complex 104 and the multiplexers 122 . . . 128. As such, the Link 153 couples the first multiplexer 122 to a first port on the root complex 104. The Link 154 couples the second multiplexer 124 to a second port on the root complex 104. The Link 155 couples the third multiplexer 126 to a third port on the root complex 104. And, the Link 156 couples the fourth multiplexer 128 to a fourth port on the root complex 104.

Within some embodiments of the present invention, the second root complex 104 may be configured as an endpoint device coupled to the first PCI Express root complex 102 via the Link 137. In such embodiments, the Link 137 may be utilized to transfer data between the first PCI Express root complex 102 and the second PCI Express root complex device 104 for use by the second root complex device 104 should a switch over occur in which the second root complex device 104 then operates as the primary root complex. Such data may include data pertaining to specific applications operating within the system 100. If the second root complex is implemented within a root complex subsystem that contains one or more PCI Express controllers, one of these controllers may be configured as the endpoint device coupled to the first PCI Express root complex 102 via the Link 137.

Each of the N multiplexers 122 . . . 128 are configured so that their first set of input/output ("I/O") lines are connected to their associated endpoint device, second set of I/O lines are connected to the first PCI Express root complex 102, and a third set of I/O lines are connected to the second PCI Express root complex 104. Depending on the state of a received selection signal (identified in FIG. 2 as "SEL") each multiplexer will communicate data between its associated endpoint device and either the first PCI Express root complex 102 or the second PCI Express root complex 104. The manner in which the state of this selection signal is determined is further described hereinafter with respect to FIG. 3.

Figure 2:
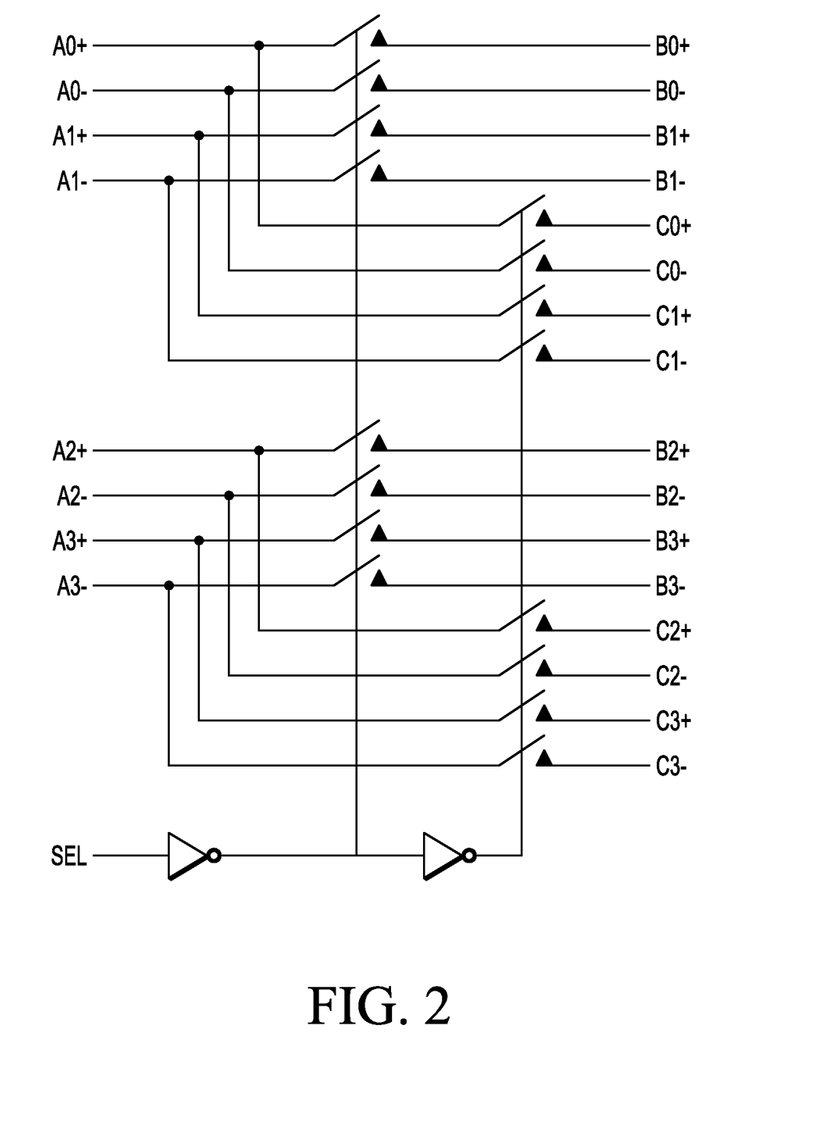
FIG. 2 illustrates a block diagram of an exemplary multiplexing device utilized in embodiments of the present invention.

FIG. 2 illustrates a block diagram of an exemplary multiplexer for implementation within embodiments of the present invention. As was previously noted, a Link may be comprised of various combinations of differential signal pairs referred to as Lanes. As such, the various Links described with respect to the data processing system 100 may each be configured with any one of the available Link bandwidths available within a PCI Express system. For purposes of describing an exemplary embodiment of the implementation of one or more of the multiplexers 122 . . . 128, it will be assumed that the Link comprises two Lanes. For purposes of illustration, assume then that the first multiplexer 122 couples the first root complex 102 to the first endpoint device 112 via the two-lane Links 133 and 141. Likewise, the Link 153 between the multiplexer 122 and the second root complex 104 will be a two-lane Link. Furthermore, for purposes of implementing the SEL selection signal, the dashed line 153 can be assumed to include a data line between the root complex 104 and the multiplexer 122 for transmission of the SEL selection signal.

In this example, the endpoint device 112 is coupled to the multiplexer 122 by the Link 141 connected to the A[0:3] I/O lines (designated in FIG. 2 as A0+, A0−, A1+, A1−, A2+, A2−, A3+, A3−) of the multiplexer 122. The Link 133 is connected to the B[0:3] I/O lines (designated in FIG. 2 as B0+, B0−, B1+, B1−, B2+, B2−, B3+, B3−) of the multiplexer 122. The Link 153 from the root complex 104 is connected to the C[0:3] I/O lines (designated in FIG. 2 as C0+, C0−, C1+, C1−, C2+, C2−, C3+, C3−) of the multiplexer 122. The SEL selection signal along the dashed line 153 from the root complex 104 is received by the SEL input of the multiplexer 122.

The N multiplexers 124 . . . 128 may be similarly configured as the multiplexer 122, except it should be repeated that any one or more of these multiplexers may be configured for implementing any one of the Link bandwidths previously noted. In the exemplary multiplexer illustrated in FIG. 2, when the SEL selection signal is of a Low binary value, then the multiplexer (e.g., any one or more of the N multiplexers 122 . . . 128) will communicate data between the A[0:3] and B[0:3] I/O lines. If the SEL selection signal is changed to a High binary value, then the multiplexer will switch the communication of the data signals to occur between the A[0:3] and C[0:3] I/O lines. Therefore, taking the example of the first multiplexer 122, when the SEL selection signal is Low, data is communicated between the first endpoint device 112 and the first root complex 102. If the selection signal is changed to a High level, then the multiplexer 122 will communicate the data between the endpoint device 112 and the second root complex 104, which includes terminating communication of the data between the endpoint device 112 and the first root complex 102. In other words, when the SEL selection signal is changed from a Low level to a High level, communication of data to or from the endpoint device 112 is switched from occurring between the endpoint device 112 and the first root complex 102 to then occurring between the endpoint device 112 and the second root complex 104.

Likewise, with respect to the second multiplexer 124, when the SEL selection signal is Low, data is communicated between the second endpoint device 114 and the first root complex 102. If the selection signal is changed to a High level, then the multiplexer 124 will communicate the data between the endpoint device 114 and the second root complex 104, which includes terminating communication of the data between the endpoint device 114 and the first root complex 102. In other words, when the SEL selection signal is changed from a Low level to a High level, communication of data to or from the endpoint device 114 is switched from occurring between the endpoint device 114 and the first root complex 102 to then occurring between the endpoint device 114 and the second root complex 104. Likewise, with respect to the third multiplexer 126, when the SEL selection signal is Low, data is communicated between the third endpoint device 116 and the first root complex 102. If the selection signal is changed to a High level, then the multiplexer 126 will communicate the data between the endpoint device 116 and the second root complex 104, which includes terminating communication of the data between the endpoint device 116 and the first root complex 102. In other words, when the SEL selection signal is changed from a Low level to a High level, communication of data to or from the endpoint device 116 is switched from occurring between the endpoint device 116 and the first root complex 102 to then occurring between the endpoint device 116 and the second root complex 104. Likewise, with respect to the Nth multiplexer 128, when the SEL selection signal is Low, data is communicated between the fourth endpoint device 118 and the Nth endpoint device 120 and the first root complex 102 via the switching device 110. If the selection signal is changed to a High level, then the multiplexer 128 will communicate the data between the endpoint device 118 and the Nth endpoint device 120 and the second root complex 104 via the switching device 110, which includes terminating communication of the data between the endpoint device 118 and the Nth endpoint device 120 and the first root complex 102.

In other words, when the SEL selection signal is changed from a Low level to a High level, communication of data to or from the endpoint device 118 and the Nth endpoint device 120 is switched from occurring between the endpoint device 118 and the Nth endpoint device 120 and the first root complex 102 to then occurring between the endpoint device 118 and the Nth endpoint device 120 and the second root complex 104.

Note that the N multiplexers may be implemented with any hardware that performs an equivalent function as described herein, including SERDES multiplexers, which are well known in the art.

Within embodiments of the present invention as described herein, a PCI Express root complex is functioning correctly when it is communicating data between the processor(s) and memory subsystem and its associated N endpoint devices so that each of the N endpoint devices is able to satisfactorily perform their respective functions or operations. A primary root complex may fail due to many different hardware or software reasons, including but not limited to (1) the processor(s) "hanging" or "freezing," such as when either software running in the process, or processor hardware ceases to respond to inputs (e.g., due to a race condition in the software that was not previously detected during system testing), (2) a manufacturing fault (e.g., on the printed circuit board on which the processor(s) is implemented), which does not manifest itself until after the system has been stressed for a long period of time or under specific temperature conditions, and (3) hardware or software-related errata, which rarely occur under a very specific set of conditions, causing a peripheral device to become unstable.

Figure 3:
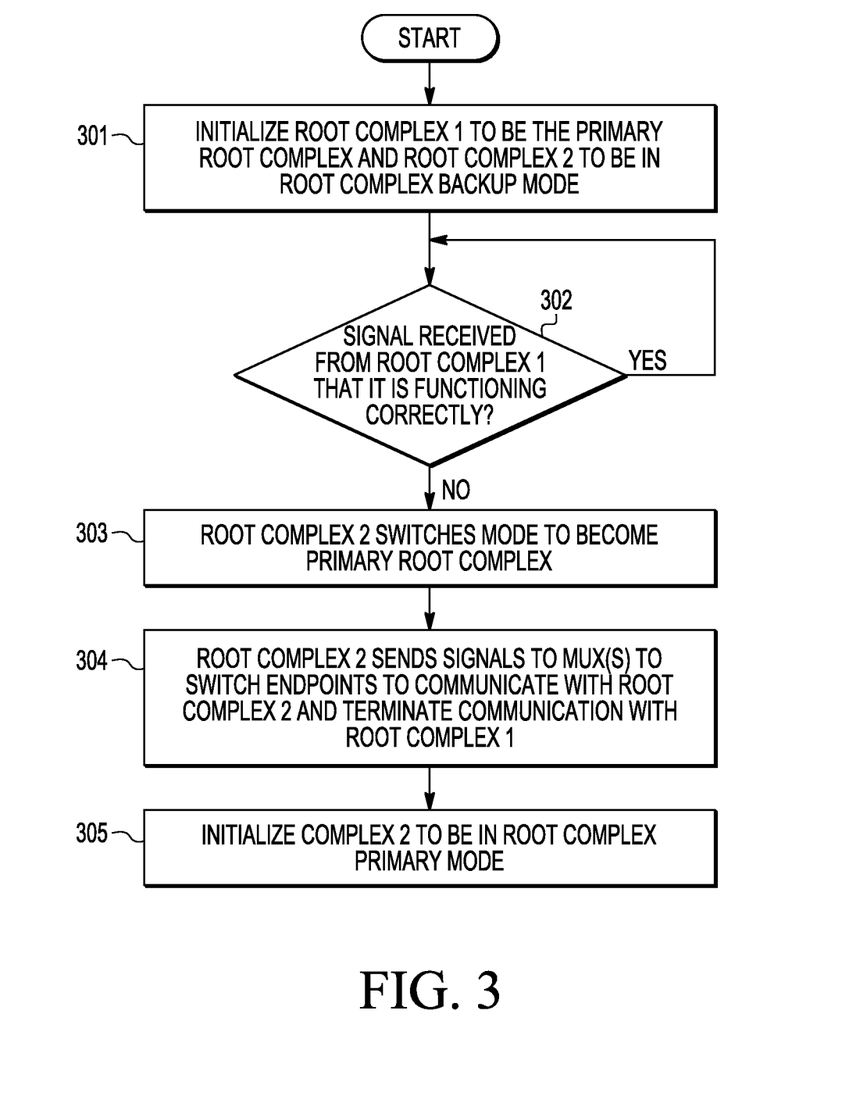
FIG. 3 illustrates a flow diagram of a system and process implemented in accordance with embodiments of the present invention.

Referring now to FIGS. 1 and 3, a system and process is described whereby a backup PCI Express system is able to take over as the primary PCI Express system for ensuring that the N endpoint devices continue to function in a desired manner when the initial primary root complex is no longer functioning correctly, such as if it endures some type of failure. The system and process 300 starts and proceeds to process block 301 whereby the data processing system 100 initializes the first root complex 102 to function as the primary PCI Express root complex for communicating data between the processor 106, memory subsystem 103, and the N endpoint devices 112 . . . 120. As a result, the second root complex 104 may be initialized to operate in a root complex backup mode. Furthermore, the second root complex 104 may be initialized to function as a PCI Express endpoint device via the Link 137 coupled to the first root complex 102.

While the first root complex 102 is functioning as the primary PCI Express root complex, the N multiplexers 122 . . . 128 will be initialized to communicate data between their respective endpoint devices 112 . . . 120 and the first root complex 102. As an example, when the second root complex 104 is initialized to be in a root complex backup mode, it may transmit a Low binary signal (e.g., along each of the dashed lines 153-156) to the N multiplexers 122 . . . 128. As a result, while the second root complex 104 is in a root complex backup mode, there is no data communicated between the N endpoint devices 112 . . . 120 and the second root complex 104. In other words, the first root complex device 102 operates as the primary root complex for the hierarchy of N endpoint devices.

It is during this state of operation of the data processing system 100 that the second root complex 104 may monitor some type of signal from the first root complex 102, which is operating within a primary PCI Express root complex mode. Such a signal may be communicated between the first root complex 102 and the second root complex 104 via the Link 137. Or, a separate signal line may be implemented between the first root complex 102 and the second root complex 104, which is illustrated in FIG. 1 as transmission line 150, which may be implemented as a GPIO ("general-purpose input/out") signal, a heartbeat message signal, or any other equivalent and appropriate signal for communicating to the second root complex 104 that the first root complex 102 is functioning correctly.

In process block 302, the first root complex 102 will continue to operate in primary PCI Express root complex mode, and the second root complex 104 will continue to operate in a root complex backup mode as long as the foregoing signal transmitted from the first root complex 102 to the second root complex 104 indicates that the first root complex 102 is functioning correctly. This is indicated by the YES feedback path from the process block 302. In process block 302, if the value of this signal changes, which may indicate that the first root complex 102 is no longer functioning correctly, the system and process will then proceed to process block 303, whereby the second root complex 104 switches modes to operate as the primary root complex for the hierarchy of N endpoint devices. This is indicated by the NO path from the process block 302. There are various manners in which such a signal change may be implemented between the first root complex 102 and the second root complex 104. One of ordinary skill in the art would be able to configure such a signal to change under the specified conditions as described herein, which would include implementing circuitry or software within both of the first root complex 102 and the second root complex 104 for transmitting, receiving, or interpreting such a signal. As an example, such a signal may be implemented to be of a first value as long as the first root complex 102 is functioning correctly (e.g., there is a desired threshold power level within the first root complex 102). Thus, if a power failure occurred within the first root complex 102, the value of the signal would change, and circuitry or software within the second root complex 104 would be able to interpret this change of the signal to then cause the second root complex 104 to switch from operating in a backup mode to then operate as the primary PCI Express root complex.

Alternatively, circuitry or software may be implemented within the first root complex 102 to modify this signal transmitted to the second root complex 104 when it is desired to perform some sort of maintenance routine on the first root complex 102. In such a circumstance, it may be desirable for the second root complex 104 to then function as the primary PCI Express root complex for servicing the N endpoint devices 112 . . . 120 while the first root complex 102 is under maintenance.

Referring again to FIGS. 1 and 3, in process block 304, the second root complex 104 will then send signals to each one of the N multiplexers 122 . . . 128 so that there is a switching of the communication of data from occurring between the N endpoint devices 112 . . . 120 and the first root complex 102 to then occur between the N endpoint devices 112 . . . 120 and the second root complex 104. In process block 305, the second root complex 104 may then perform an initialization process to therefore begin functioning in a primary PCI Express root complex mode, which may include the identification and enumeration of the N endpoint devices 112 . . . 120 so that data is then properly and successfully communicated by the second root complex 104 between the N endpoint devices 112 . . . 120 and the processor(s) 108 and the memory subsystem 105. In other words, the second root complex device 104 operates as the primary root complex for the hierarchy of N endpoint devices.

If the signal between the first root complex 102 and the second root complex 104 on line 150 is implemented as a heartbeat message, which indicates the well-being of the software running on the first root complex 102, it would be the failure to receive such a heartbeat message by the second root complex 104 that would indicate the failure of the first root complex 102. Such a heartbeat message may be delivered by a device driver in the first root complex 102 that writes the heartbeat protocol message to scratch pad register(s) and then writes to a doorbell register causing an interrupt to be delivered to the second root complex 104. Such a heartbeat message implements a heartbeat protocol which allows a primary host system (i.e., the hierarchy of the first root complex 102) to inform a backup host system (i.e., the hierarchy of the second root complex 104) that it is "alive and well." Furthermore, such a heartbeat message may be implemented in a bi-directional manner so that it is also possible for the second root complex 104 to communicate whether it is functioning correctly to the first root complex 102, which may be implemented with respect to the system and process illustrated in FIG. 5 described hereinafter.

Figure 4:
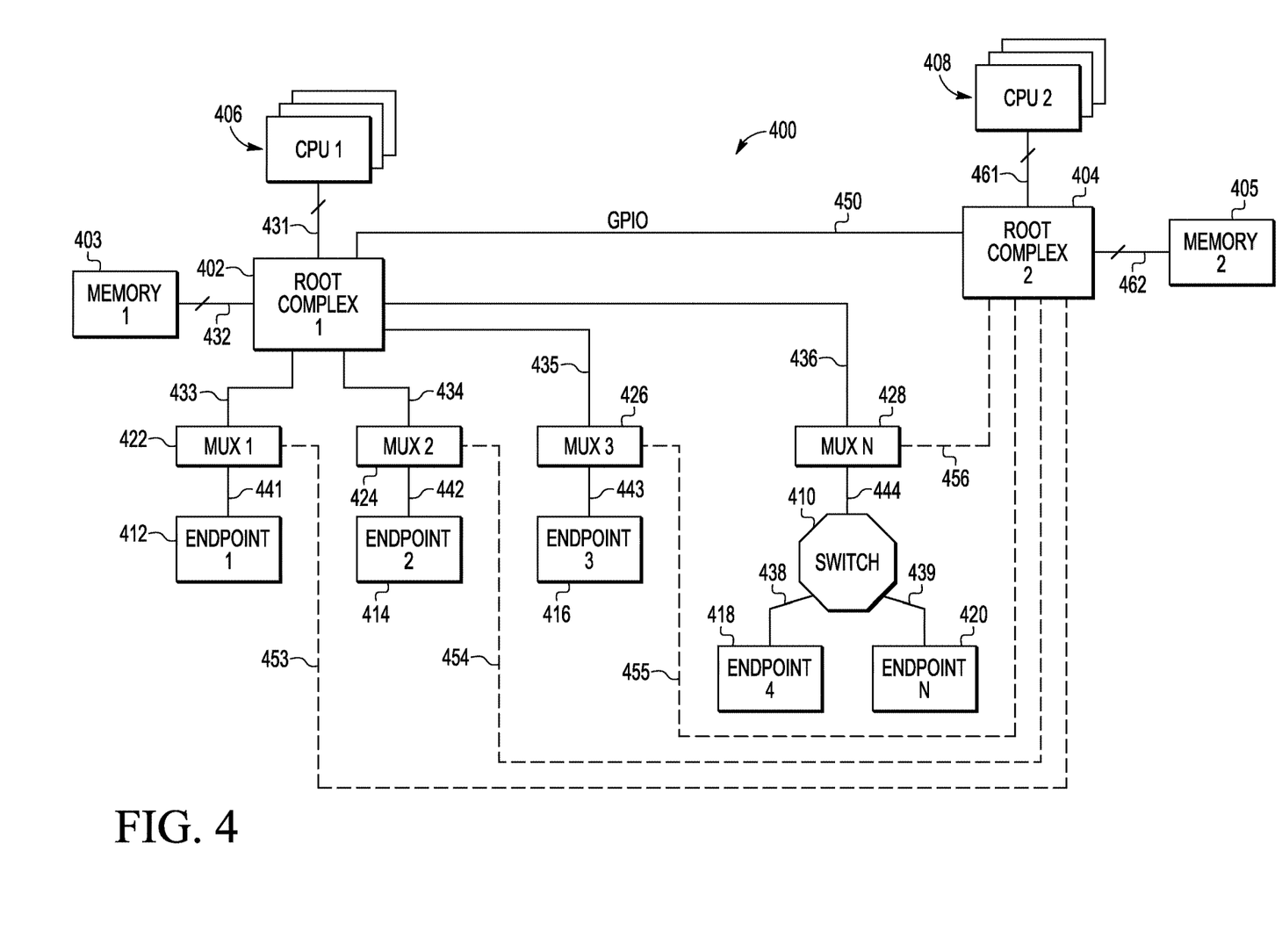
FIG. 4 illustrates a data processing system configured in accordance with further embodiments of the present invention.

FIG. 4 illustrates a data processing system 400 configured in accordance with further embodiments of the present invention. The data processing system 400 is similarly configured as the data processing system 100, except that the PCI Express Root Complex 2 is not configured as an endpoint of the PCI Express Root Complex 1 when the PCI Express Root Complex 1 is operating as the primary PCI Express root complex. The system and process 300 described with respect to FIG. 3 can be implemented within the data processing system 400.

Within FIG. 4, the one or more processors (labeled as "CPU 1" in FIG. 4) 406 are coupled to a first PCI Express root complex (labeled as "Root Complex 1") 402 by a local bus 431, or any other equivalent bus architecture. Likewise, a first memory subsystem (labeled as "Memory 1") 403 is coupled to the first PCI Express root complex 402 by a local bus 432, which may be part of the local bus 431.

The data processing system 400 may implement one or more endpoint devices for coupling through the first PCI Express root complex 402 to the processor 406 and memory subsystem 403. One or more of the endpoint devices are PCI Express endpoint devices. One or more of the endpoint devices may include legacy PCI devices coupled to the root complex 402 by a PCIe-to-PCI bridge device (not shown). FIG. 4 illustrates merely one example of such a network configuration for illustrating and describing embodiments of the present invention. This example was chosen and described in order to best explain principles of the invention and the practical application, and to enable others of ordinary skill in the art to understand the invention for various embodiments with various modifications as may be suited to the particular use contemplated. This exemplary network configuration shows a hierarchy including N endpoint devices 412 . . . 420 (where N is greater than or equal to 1). A first endpoint device (labeled as "Endpoint 1") 412 is coupled to a first port on the first PCI Express root complex 402 via a Link 433, the first multiplexor (labeled as "MUX 1") 422, and a Link 441. The multiplexor 422 is implemented to provide a system-level redundancy for the data processing system 400 as further described herein. It should be noted that a typical PCI Express network architecture would not include the multiplexer 422 and the Link 441 within a hierarchy domain, but would merely couple the first PCI Express root complex 402 to the endpoint device 412 via the Link 433. In the exemplary data processing system 400 illustrated in FIG. 4, a second endpoint device (labeled as "Endpoint 2") 414 is coupled to the first PCI Express root complex 402 by the Link 434, the second multiplexer (labeled as "MUX 2") 424, and the Link 442. Similarly, a third endpoint device (labeled as "Endpoint 3") 416 is coupled to the first PCI Express root complex 402 via the Link 435, the third multiplexer (labeled as "MUX 3") 426, and the Link 443. As with respect to the first endpoint device 412, if the described PCI Express system was implemented without the system-level redundancy aspects according to embodiments of the present invention, the second endpoint device 414 would merely be coupled to the first PCI Express root complex 402 in this hierarchy domain via the Link 434 without the intervening second multiplexer 424 and the Link 442, and the third endpoint device 416 would merely be coupled to the first PCI Express root complex 402 in this hierarchy domain via the Link 435 without the intervening third multiplexer 426 and the Link 443.

To illustrate how embodiments of the present invention may incorporate coupling multiple endpoints in a hierarchy to a root complex via a switching device, the exemplary data processing system 400 of FIG. 4 further couples a fourth endpoint device (labeled as "Endpoint 4") 418 to the first PCI Express root complex 402 via a Link 436, a fourth multiplexer (labeled as "MUX N") 428, a Link 444, a PCI Express switching device (labeled as "Switch") 410, and a Link 438. Likewise, another endpoint device (labeled as "Endpoint N") 420 is shown coupled to the first PCI Express root complex 402 via the Link 436, the fourth multiplexer 428, the Link 444, the switching device 410, and a Link 439. The fourth multiplexer 428 is labeled as MUX N to indicate that there could be N (where N is greater than or equal to 1) multiplexers coupling a plurality of N endpoint devices or switching devices to the first PCI Express root complex 402. The exemplary multiplexer previously described with respect to FIG. 2 may be implemented for any one or more of the N multiplexers in the system 400. Therefore, the connections and functionalities previously described with respect to the multiplexers 122 . . . 128 implemented in the system 100 apply in a similar manner to the multiplexers 422 . . . 428 implemented in the system 400.

The data processing system 400 further includes a second PCI Express root complex (labeled as "Root Complex 2") 404, which may be coupled to a second set of one or more processors (labeled as "CPU 2") 408 via a local bus 461, or any other equivalent bus architecture. Note that embodiments of the present invention may couple the first and second root complexes to the same processor(s). Furthermore, the second root complex 404 is coupled to a second memory subsystem (labeled as "Memory 2") 405 via a local bus 462, which may be a part of the local bus 461. The dashed lines 453-456 represent Links between the second root complex 404 and the multiplexers 422 . . . 428. As such, the Link 453 couples the first multiplexer 422 to a first port on the root complex 404. The Link 454 couples the second multiplexer 424 to a second port on the root complex 404. The Link 455 couples the third multiplexer 426 to a third port on the root complex 404. And, the Link 456 couples the fourth multiplexer 428 to a fourth port on the root complex 404.

Each of the N multiplexers 422 . . . 428 are configured so that their first set of input/output ("I/O") lines are connected to their associated endpoint device, a second set of I/O lines are connected to the first PCI Express root complex 402, and a third set of I/O lines are connected to the second PCI Express root complex 404. Depending on the state of a received selection signal (e.g., the SEL selection signal illustrated in FIG. 2) each multiplexer will communicate data between its associated endpoint device and either the first PCI Express root complex 402 or the second PCI Express root complex 404. The manner in which the state of this selection signal is determined is further described herein with respect to FIG. 3.

Figure 5:
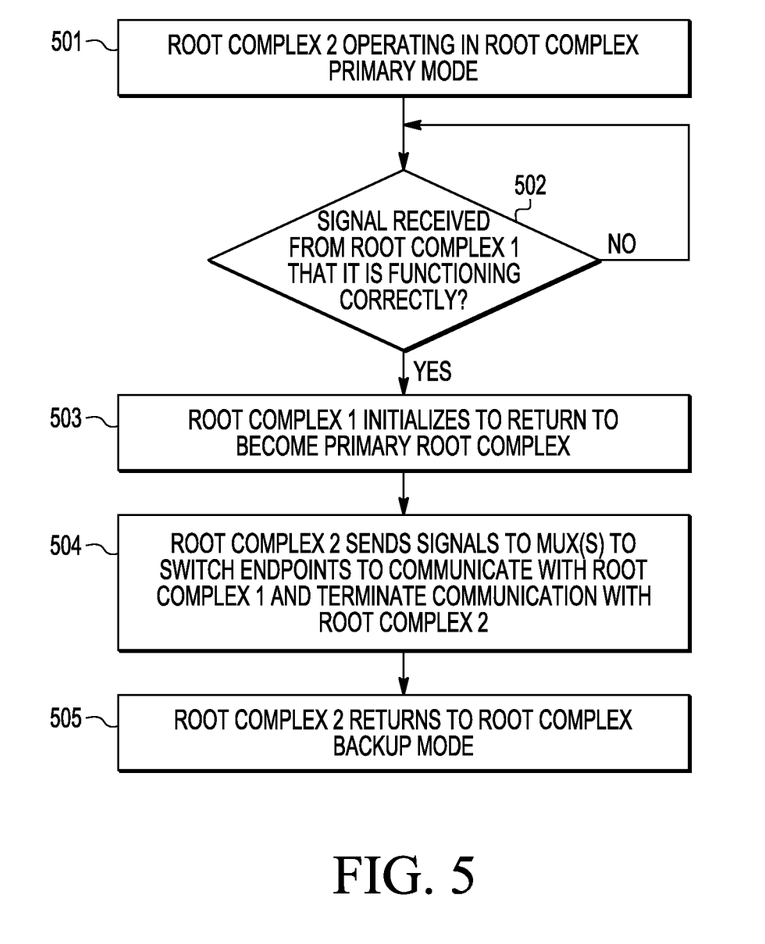
FIG. 5 illustrates a flow diagram of a system and process implemented in accordance with further embodiments of the present invention.

Referring next to FIG. 5, there is illustrated a system and process 500 in accordance with further embodiments of the present invention. This system and process 500 may be implemented within either of the data processing systems 100 or 400. Furthermore, the system and process 500 may be implemented subsequent to implementation of the system and process 300 previously described.

The system and process 500 begins when the second root complex (i.e., Root Complex 2) is operating in a primary PCI Express root complex mode for the hierarchy of the N endpoint devices. For example, the Root Complex 2 may be operating in such a primary root complex mode after it has taken over from the Root Complex 1 in accordance with the process blocks 303-305 as described with respect to FIG. 3. In process block 501, the Root Complex 2 is operating in a primary PCI Express root complex mode whereby it is communicating data between the N endpoint devices and the processor(s) and memory subsystem. In process block 502, the Root Complex 2 will continue operating in such a primary mode as long as it does not receive a signal from the Root Complex 1 that the Root Complex 1 is now functioning correctly or otherwise signals the Root Complex 2 that the Root Complex 1 will be taking over the primary PCI Express root complex mode for servicing the hierarchy of the N endpoints. When a signal is received by the Root Complex 2 from the Root Complex 1 that the Root Complex 1 is functioning correctly or otherwise is requesting to take over as the primary PCI Express root complex, the system and process 500 proceeds to the process block 503 whereby the Root Complex 1 initializes to return to operate as the primary PCI Express root complex system with respect to the hierarchy of endpoints. In process block 504, the Root Complex 2 sends signals to the N multiplexers to switch so that the endpoints will now communicate with the Root Complex 1. Such a signaling from the Root Complex 1 to the endpoints may be implemented across the links between the Root Complex 1 and the N multiplexers. In process block 505, the Root Complex 2 then returns to operation in a root complex backup mode.

Aspects of the present disclosure provide a data processing system including a first PCI Express root complex; a PCI Express endpoint device; a second PCI Express root complex; a first multiplexer coupling the first PCI Express root complex to the PCI Express endpoint device for communication of data between the first PCI Express root complex and the PCI Express endpoint device, wherein the first multiplexer may include circuitry configured to switch the communication of the data to occur between the PCI Express endpoint device and the second PCI Express root complex; and a PCI Express Link coupled between the first and second PCI Express root complexes. The PCI Express Link may include one or more Lanes implementing full-differential signaling between the first PCI Express root complex and the second PCI Express root complex. Each of the one or more Lanes may include four wires wherein a first pair of the four wires transfers signals from the first PCI Express root complex to the second PCI Express root complex, and wherein a second pair of the four wires transfers signals from the second PCI Express root complex to the first PCI Express root complex. The PCI Express Link may be configured to transfer information between the first PCI Express root complex and the second PCI Express root complex. The information transferred by the PCI Express Link may be utilized by the second PCI Express root complex subsequent to the switch of the communication of the data to occur between the PCI Express endpoint device and the second PCI Express root complex instead of between the PCI Express endpoint device and the first PCI Express root complex, wherein the information pertains to a specific application operating within the PCI Express endpoint device before the switch of the communication of the data. The second PCI Express root complex may be implemented within a root complex subsystem that contains a PCI Express controller, and wherein the PCI Express controller may be configured as a PCI Express endpoint device coupled to the first PCI Express root complex via the PCI Express Link. The data processing system may further include a processor and a memory system coupled to the first PCI Express root complex, wherein the circuitry configured to switch the communication of the data to occur between the PCI Express endpoint device and the second PCI Express root complex may be configured to perform the switch in response to a failure of the first PCI Express root complex to communicate data between the PCI Express endpoint device and the processor or the memory system in a manner so that the PCI Express endpoint device is able to satisfactorily operate.

Aspects of the present disclosure provide a data processing system that includes a first PCI Express system initialized to operate as a primary PCI Express system within the data processing system, wherein the first PCI Express system includes a first PCI Express root complex, a PCI Express endpoint device, a first processor coupled to the first PCI Express root complex, and a first memory system coupled to the first PCI Express root complex. The data processing system includes a second PCI Express system initialized to operate as a backup PCI Express system within the data processing system, the second PCI Express system including a second PCI Express root complex; a multiplexer having a first input coupled to the first PCI Express root complex, a second input coupled to the second PCI Express root complex, and an output coupled to the PCI Express endpoint device; and a PCI Express Link coupled between the first and second PCI Express root complexes. The PCI Express Link may implement full-differential signaling between the first PCI Express root complex and the second PCI Express root complex. The second PCI Express root complex may be initialized to function as a PCI Express endpoint device coupled to the first PCI Express root complex when the first PCI Express system is initialized to operate as the primary PCI Express system and the second PCI Express system is initialized to operate as the backup PCI Express system. While the second PCI Express system operates as the backup PCI Express system, the second PCI Express root complex may be configured to signal the multiplexer so that no data is communicated between the second PCI Express root complex and the PCI Express endpoint device via the multiplexer. In response to a signal received by the second PCI Express root complex from the first PCI Express root complex via the PCI Express Link, the second PCI Express system may switch modes to thereafter operate as the primary PCI Express system whereby communication of data will then commence between the second PCI Express root complex and the PCI Express endpoint device via the multiplexer. The multiplexer may include circuitry configured to switch the communication of the data to occur between the PCI Express endpoint device and the second PCI Express root complex, and circuitry configured to terminate the communication of the data between the first PCI Express root complex and the PCI Express endpoint device. The circuitry configured to switch the communication of the data to occur between the PCI Express endpoint device and the second PCI Express root complex may be configured to perform the switch in response to receipt by the multiplexer of a switch signal generated in response to a failure of the first PCI Express root complex to function correctly. The second PCI Express system may include a second processor coupled to the second PCI Express root complex, wherein when the second PCI Express system switches modes to operate as the primary PCI Express system, the data is communicated between the second processor and the PCI Express endpoint device. The PCI Express Link may be configured to transfer information between the first PCI Express root complex and the second PCI Express root complex, wherein the information transferred by the PCI Express Link is used by the second PCI Express root complex to identify and enumerate the PCI Express endpoint device in order to enable data communication between the second PCI Express root complex and the PCI Express endpoint device when the second PCI Express system switches modes to operate as the primary PCI Express system.

Aspects of the present disclosure provide for performance of a method in a data processing system that includes a first PCI Express root complex, a PCI Express endpoint device, a second PCI Express root complex, a PCI Express Link coupled between the first PCI Express root complex and the second PCI Express root complex, and a multiplexer having a first input coupled to the first PCI Express root complex, a second input coupled to the second PCI Express root complex, and an output coupled to the PCI Express endpoint device. The method includes initializing the first PCI Express root complex to operate as a primary root complex within the data processing system whereby data is communicated between the first PCI Express root complex and the PCI Express endpoint device via the multiplexer; initializing the second PCI Express root complex to operate as a backup root complex within the data processing system whereby data is not communicated between the second PCI Express root complex and the PCI Express endpoint device via the multiplexer; and in response to a signal received by the second PCI Express root complex from the first PCI Express root complex via the PCI Express Link, initializing the second PCI Express root complex to thereafter operate as the primary root complex within the data processing system whereby data is communicated between the second PCI Express root complex and the PCI Express endpoint device via the multiplexer. The method may further include the second PCI Express root complex sending a signal to the multiplexer to terminate data communication between the first PCI Express root complex and the PCI Express endpoint device. The method may further include initializing the second PCI Express root complex as a PCI Express endpoint device coupled to the first PCI Express root complex via the PCI Express Link when the second PCI Express root complex is initialized to operate as the backup root complex within the data processing system. The method may further include transferring information between the first PCI Express root complex and the second PCI Express root complex via the PCI Express Link to enable the second PCI Express root complex to identify and enumerate the PCI Express endpoint device when the second PCI Express root complex is initialized to operate as the primary root complex within the data processing system.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "circuitry," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages.

Aspects of the present invention are described herein with reference to illustrated flow diagrams or block diagrams of methods, apparatus (systems), and computer program products according to embodiments of the invention. It will be understood that each process block of the illustrated flow diagrams or block diagrams, and combinations of process blocks in the illustrated flow diagrams or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means or circuitry for implementing the functions or acts specified in a block or blocks of the flow diagrams or block diagrams.

These computer program instructions may also be stored in a computer readable medium that can direct a computer, other programmable data processing apparatus, or other devices to function in a particular manner, such that the instructions stored in the computer readable medium produce an article of manufacture including instructions which implement the functions or acts specified in a block or blocks of the flow diagrams or block diagrams.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in a block or blocks of the flow diagrams or block diagrams.

Reference is made herein to a device or circuitry "configured" to perform a function or act. It should be understood that this may include selecting predefined logic blocks and logically associating them, such that they provide particular logic functions, which includes monitoring or control functions. It may also include programming computer software-based logic of a control device, wiring discrete hardware components, or a combination of any or all of the foregoing.

Reference throughout this specification to "an embodiment," "embodiments," "further embodiments," or similar language means that a particular feature, structure, or characteristic described in connection with the embodiments is included in at least one embodiment of the present invention. Thus, appearances of the phrases "in one embodiment," "in an embodiment," "embodiments," and similar language throughout this specification may, but do not necessarily, all refer to the same embodiment. Furthermore, the described features, structures, aspects, or characteristics of embodiments of the invention may be combined in any suitable manner in one or more embodiments. Correspondingly, even if features may be initially claimed as acting in certain combinations, one or more features from a claimed combination can in some cases be excised from the combination, and the claimed combination can be directed to a sub-combination or variation of a sub-combination.

In the descriptions herein, numerous specific details are provided, such as examples of programming, software modules, user selections, network transactions, database queries, database structures, hardware modules, hardware circuits, hardware chips, controllers, etc., to provide a thorough understanding of embodiments of the invention. One skilled in the relevant art will recognize, however, that aspects of the invention may be practiced without one or more of the specific details, or with other methods, components, materials, and so forth. In other instances, well-known structures, materials, or operations may be not shown or described in detail to avoid obscuring aspects of the invention.

Benefits, advantages, and solutions to problems have been described above with regard to specific embodiments. However, the benefits, advantages, and solutions to problems, and any element(s) that may cause any benefit, advantage, or solution to occur or become more pronounced may be not to be construed as critical, required, or essential features or elements of any or all the claims.

Those skilled in the art having read this disclosure will recognize that changes and modifications may be made to the embodiments without departing from the scope of the present invention. It should be appreciated that the particular implementations shown and described herein may be illustrative of the invention and may be not intended to otherwise limit the scope of the present invention in any way. For example, a signal for causing a switch of the primary root complex from one of the root complex devices to the other may originate from an endpoint device, which has determined that can no longer satisfactorily function, such as due to a failure of data communication between the endpoint device and the root complex. In such an example, the data processing system may implement hardware and software to communicate such a failure signal to the backup root complex. Other variations to the embodiments of the present invention disclosed herein may be within the scope of the following claims.

While this specification contains many specifics, these should not be construed as limitations on the scope of the invention or of what can be claimed, but rather as descriptions of features specific to particular implementations of the invention. Headings herein may be not intended to limit the invention, embodiments of the invention, or other matter disclosed under the headings.

As used herein, the terms "comprises," "comprising," "includes," or any other variation thereof, may be intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

Herein, the term "or" may be intended to be inclusive, wherein "A or B" includes A or B and also includes both A and B.

The terminology used herein is for the purpose of describing particular embodiments only and is not intended to be limiting of the invention. As used herein, the singular forms "a," "an," and "the" may be intended to include the plural forms as well, unless the context clearly indicates otherwise. It will be further understood that the terms "comprises" or "comprising," when used in this specification, which may include the claims herein below, specify the presence of stated features, integers, steps, operations, elements, or components, but do not preclude the presence or addition of one or more other features, integers, steps, operations, elements, components, or groups thereof.

The corresponding structures, materials, acts, and equivalents of all means or step plus function elements in the claims below may be intended to include any structure, material, or act for performing the function in combination with other claimed elements as specifically claimed.

What is claimed is:

1. A data processing system comprising:
    a first PCI Express root complex;
    a PCI Express endpoint device;
    a second PCI Express root complex;
    a first multiplexer coupling the first PCI Express root complex to the PCI Express endpoint device for communication of data between the first PCI Express root complex and the PCI Express endpoint device, wherein the first multiplexer includes circuitry configured to switch the communication of the data to occur between the PCI Express endpoint device and the second PCI Express root complex; and
    a PCI Express Link coupled between the first and second PCI Express root complexes, the second PCI Express root complex configured to monitor a signal from the first PCI Express root complex by way of the PCI Express Link.

2. The data processing system as recited in claim 1, wherein the PCI Express Link comprises one or more Lanes implementing full-differential signaling between the first PCI Express root complex and the second PCI Express root complex.

3. The data processing system as recited in claim 2, wherein each of the one or more Lanes comprises four wires wherein a first pair of the four wires transfers signals from the first PCI Express root complex to the second PCI Express root complex, and wherein a second pair of the four wires transfers signals from the second PCI Express root complex to the first PCI Express root complex.

4. The data processing system as recited in claim 1, wherein the PCI Express Link is configured to transfer information between the first PCI Express root complex and the second PCI Express root complex.

5. The data processing system as recited in claim 1, wherein the monitored signal is utilized by the second PCI Express root complex subsequent to the switch of the communication of the data to occur between the PCI Express endpoint device and the second PCI Express root complex instead of between the PCI Express endpoint device and the first PCI Express root complex, wherein the information pertains to a specific application operating within the PCI Express endpoint device before the switch of the communication of the data.

6. The data processing system as recited in claim 1, wherein the second PCI Express root complex is implemented within a root complex subsystem that contains a PCI Express controller, and wherein the PCI Express controller is configured as a PCI Express endpoint device coupled to the first PCI Express root complex via the PCI Express Link.

7. The data processing system as recited in claim 1, further comprising a processor and a memory system coupled to the first PCI Express root complex, wherein the circuitry configured to switch the communication of the data to occur between the PCI Express endpoint device and the second PCI Express root complex is configured to perform the switch in response to a failure of the first PCI Express root complex to communicate data between the PCI Express endpoint device and the processor or the memory system in a manner so that the PCI Express endpoint device is able to satisfactorily operate.

8. A data processing system comprising:
  a first PCI Express system initialized to operate as a primary PCI Express system within the data processing system, the first PCI Express system comprising:
    a first PCI Express root complex;
    a PCI Express endpoint device;
    a first processor coupled to the first PCI Express root complex; and
    a first memory system coupled to the first PCI Express root complex;
  a second PCI Express system initialized to operate as a backup PCI Express system within the data processing system, the second PCI Express system comprising a second PCI Express root complex;
  a multiplexer having a first input coupled to the first PCI Express root complex, a second input coupled to the second PCI Express root complex, and an output coupled to the PCI Express endpoint device; and
  a PCI Express Link coupled between the first and second PCI Express root complexes, the second PCI Express root complex configured to monitor a signal from the first PCI Express root complex by way of the PCI Express Link.

9. The data processing system as recited in claim 8, wherein the PCI Express Link implements full-differential signaling between the first PCI Express root complex and the second PCI Express root complex.

10. The data processing system as recited in claim 8, wherein the second PCI Express root complex is initialized to function as a PCI Express endpoint device coupled to the first PCI Express root complex when the first PCI Express system is initialized to operate as the primary PCI Express system and the second PCI Express system is initialized to operate as the backup PCI Express system.

11. The data processing system as recited in claim 8, wherein while the second PCI Express system operates as the backup PCI Express system, the second PCI Express root complex signals the multiplexer so that no data is communicated between the second PCI Express root complex and the PCI Express endpoint device via the multiplexer.

12. The data processing system as recited in claim 8, wherein in response to the monitored signal received by the second PCI Express root complex from the first PCI Express root complex via the PCI Express Link, the second PCI Express system switches modes to thereafter operate as the primary PCI Express system whereby communication of data will then commence between the second PCI Express root complex and the PCI Express endpoint device via the multiplexer.

13. The data processing system as recited in claim 12, wherein the multiplexer comprises:
  circuitry configured to switch the communication of the data to occur between the PCI Express endpoint device and the second PCI Express root complex; and
  circuitry configured to terminate the communication of the data between the first PCI Express root complex and the PCI Express endpoint device.

14. The data processing system as recited in claim 13, wherein the circuitry configured to switch the communication of the data to occur between the PCI Express endpoint device and the second PCI Express root complex is configured to perform the switch in response to receipt by the multiplexer of a switch signal generated in response to a failure of the first PCI Express root complex to function correctly.

15. The data processing system as recited in claim 12, wherein the second PCI Express system comprises a second processor coupled to the second PCI Express root complex, and wherein when the second PCI Express system switches modes to operate as the primary PCI Express system, the data is communicated between the second processor and the PCI Express endpoint device.

16. The data processing system as recited in claim 12, wherein the PCI Express Link is configured to transfer information between the first PCI Express root complex and the second PCI Express root complex, wherein the information transferred by the PCI Express Link is used by the second PCI Express root complex to identify and enumerate the PCI Express endpoint device in order to enable data communication between the second PCI Express root complex and the PCI Express endpoint device when the second PCI Express system switches modes to operate as the primary PCI Express system.

17. In a data processing system that includes a first PCI Express root complex; a PCI Express endpoint device; a second PCI Express root complex; a PCI Express Link coupled between the first PCI Express root complex and the second PCI Express root complex; and a multiplexer having a first input coupled to the first PCI Express root complex, a second input coupled to the second PCI Express root complex, and an output coupled to the PCI Express endpoint device, a method comprising:
  initializing the first PCI Express root complex to operate as a primary root complex within the data processing system whereby data is communicated between the first PCI Express root complex and the PCI Express endpoint device via the multiplexer;
  initializing the second PCI Express root complex to operate as a backup root complex within the data processing system whereby data is not communicated between the second PCI Express root complex and the PCI Express endpoint device via the multiplexer;

monitoring, by the second PCI Express root complex, a signal from the first PCI Express root complex via the PCI Express Link; and in response to the monitored signal received, initializing the second PCI Express root complex to thereafter operate as the primary root complex within the data processing system whereby data is communicated between the second PCI Express root complex and the PCI Express endpoint device via the multiplexer.

18. The method as recited in claim 17, further comprising the second PCI Express root complex sending a signal to the multiplexer to terminate data communication between the first PCI Express root complex and the PCI Express endpoint device.

19. The method as recited in claim 17, further comprising initializing the second PCI Express root complex as a PCI Express endpoint device coupled to the first PCI Express root complex via the PCI Express Link when the second PCI Express root complex is initialized to operate as the backup root complex within the data processing system.

20. The method as recited in claim 17, further comprising transferring information between the first PCI Express root complex and the second PCI Express root complex via the PCI Express Link to enable the second PCI Express root complex to identify and enumerate the PCI Express endpoint device when the second PCI Express root complex is initialized to operate as the primary root complex within the data processing system.

* * * * *